(12) United States Patent
Dafali et al.

(10) Patent No.: US 11,727,153 B2
(45) Date of Patent: Aug. 15, 2023

(54) MULTI-MASTER SECURITY CIRCUIT

(71) Applicant: SECURE-IC SAS, Cesson-Sevigne (FR)

(72) Inventors: Rachid Dafali, Chartres-de-Bretagne (FR); Freddy David, Thorigne-Fouillard (FR); Michel Le Rolland, Ploermel (FR); Karine Lorvellec, La Meziere (FR)

(73) Assignee: SECURE-IC SAS, Cesson-Sevigne (FR)

( * ) Notice: Subject to any disclaimer, the term of this patent is extended or adjusted under 35 U.S.C. 154(b) by 0 days.

(21) Appl. No.: 17/056,388

(22) PCT Filed: May 24, 2019

(86) PCT No.: PCT/EP2019/063519
§ 371 (c)(1),
(2) Date: Nov. 17, 2020

(87) PCT Pub. No.: WO2019/224374
PCT Pub. Date: Nov. 28, 2019

(65) Prior Publication Data
US 2021/0312091 A1 Oct. 7, 2021

(30) Foreign Application Priority Data
May 25, 2018 (EP) .................... 18305643.1

(51) Int. Cl.
*G06F 21/72* (2013.01)
*G06F 21/85* (2013.01)
*G06F 21/60* (2013.01)

(52) U.S. Cl.
CPC .............. *G06F 21/72* (2013.01); *G06F 21/85* (2013.01); *G06F 21/602* (2013.01)

(58) Field of Classification Search
CPC ... G06F 12/14–1491; G06F 21/57–572; G06F 21/602; G06F 21/72–725;
(Continued)

(56) References Cited

U.S. PATENT DOCUMENTS 10,691,837 B1 * 6/2020 Martel .................. H04L 9/0822
2003/0200451 A1 * 10/2003 Evans ................. G06F 21/6218
713/193
(Continued)

FOREIGN PATENT DOCUMENTS

CN 106685847 A * 5/2017 ............. H04L 47/32

OTHER PUBLICATIONS

Mandt, et al., "Demystifying the secure enclave processor", Azimuth security, 2016.
(Continued)

*Primary Examiner* — Kevin Bechtel
(74) *Attorney, Agent, or Firm* — BakerHostetler

(57) ABSTRACT

A System on Chip includes at least two hardware masters, a security circuit, and a communication infrastructure for communication between the hardware masters and the security circuit, the communication infrastructure being based on a given interface communication protocol. Each hardware master is configured to send a request to the security circuit for execution of the request by the security circuit through the communication infrastructure, each request comprising at least one service identifier identifying a service. The security circuit may comprise a Secure Mailbox comprising a filter configured to filter the requests received from the hardware masters, the filter being configured to determine at least one indicator bit, in response to the receipt of a request from a hardware master, using at least a part of an identifier associated with the master, the indicator bit indicating whether the master is allowed access to the Security circuit,
(Continued)

the identifier being an hardware identifier received with the request through the communication protocol, the filter filtering the requests based on the bit indicators determined for each request. The security circuit is further configured to execute the filtered requests.

15 Claims, 4 Drawing Sheets

(58) Field of Classification Search
CPC ..... G06F 21/82–85; G06F 2009/45583; G06F 2212/1052; H04L 63/0876; H04L 63/20
See application file for complete search history.

(56) References Cited

U.S. PATENT DOCUMENTS

| | | |
|---|---|---|
| 2011/0191562 A1 | 8/2011 | Chou et al. |
| 2014/0089682 A1* | 3/2014 | Gulati .................. G06F 21/575 |
| | | 713/192 |
| 2017/0364676 A1 | 12/2017 | Paaske et al. |

OTHER PUBLICATIONS

"VaultIP, FIPS 140-2 Non-proprietary Security Policy", Atsec information security corporation, Inside Secure, 2014.

* cited by examiner

MULTI-MASTER SECURITY CIRCUIT

CROSS-REFERENCE TO RELATED APPLICATIONS

This application is a National Stage of International patent application PCT/EP2019/063519, filed on May 24, 2019, which claims priority to foreign European patent application No. EP 18305643.1, filed on May 25, 2018, the disclosures of which are incorporated by reference in their entirety.

TECHNICAL FIELD

The invention generally relates to Integrated Circuits and in particular to Systems on Chips (SoC) comprising a security circuit.

BACKGROUND

Systems on Chips (SoC(s)) are widely used in a number of embedded devices such as smartphones, personal computers (PCs), tablet computers, laptop computers. Such embedded devices can carry out secret data (encrypted data, encryption keys) or sensitive data that need to be protected against attacks.

A SoC generally comprises one or more processors, memory controllers, and additional electronic components. A SoC further implements a security architecture based on a Security circuit, also called 'Secure Element' or 'Secure Enclave'. The Secure Element is responsible for the execution of cryptographic functions and management of keys. Existing architectures based on such Secure Elements make it possible to create a secured space in which the sensitive data such as the keys can be manipulated without being exposed to attack risks.

The different cryptographic functions provided by the Secure Element can be accessible to the rest of the SoC modules through a set of requests controlled in a dedicated module embedded in the Secure Element, also called "MailBox".

A Secure Element thus provides a secured and isolated computation environment.

An emitter can request a cryptographic function to the Secure Element, using one of the requests provided in the MailBox. The emitter can be for example a software application running in the SoC processor or a hardware module of the Chip (SoC).

Existing embedded systems comprise communication systems to enable data exchange between an emitter and the MailBox.

However, conventional embedded systems associated with existing MailBoxes cannot identify the emitter. Accordingly, any master (emitter) connected to the communication system can directly access to the Secure Element (also called 'Enclave' or 'Secure Enclave') or might pose itself as an authorized emitter while it is not.

Some existing security architectures are based on multi-master Mailboxes. A multi-master mailbox refers to a Secure Element architecture in which the Mailbox can communicate with multiple masters (or emitters), as disclosed for example in:

- Apple. IOs security, IOs 10. Apple, 2017;
- T. Mandt, M. Solnik, and D. Wang. Demystifying the secure enclave processor. Azimuth security, 2016.

In such multi-master Mailbox approach, the Mailbox is used to ensure exchanges between each emitter (master) comprising an Application Processor (AP) core and a Secure Enclave forming the Secure Element. The Security Enclave ensures all the cryptographic operations dedicated to the management of the data protection keys. The communication between the AP core and the Secure Enclave is limited to a Mailbox triggered by interruptions and to data buffers of a shared memory. A module is added between the AP core and the Secure Enclave to restrict the AP core access to the Mailbox only and not to the whole Secure Enclave.

When sending a message, the AP writes to the Inbox of the mailbox, this operation triggering an interrupt in a Secure Enclave Processor (SEP), in order to notify receipt of a message to the SEP. When the response is ready, the SEP writes a message back into Outbox of the mailbox by triggering a new interrupt to notify receipt of a message to the Application Processor.

However, in such multi-master Mailboxes, the identification of the master (emitter) is rough and unsecure as discussed in Atsec. VaultIP, FIPS 140-2 Non-proprietary Security Policy. Inside Secure, 2014.

Accordingly, improved devices and methods are needed that provide a secure access to the Secure Element.

SUMMARY

There is provided a System on Chip comprising:
- at least two hardware masters;
- a security circuit;
- a communication infrastructure for communication between the at least two hardware masters and the security circuit, the communication infrastructure being based on a given interface communication protocol.

Each hardware master is configured to send a request to the security circuit for execution of the request by the security circuit through the communication infrastructure, each request comprising at least one service identifier identifying a service. The security circuit may comprise a Secure Mailbox. The Secure Mailbox may comprise:
- a filter configured to filter the requests received from the hardware masters, the filter being configured to determine at least one indicator bit, in response to the receipt of a request from a hardware master, using at least a part of an identifier associated with the master, the indicator bit indicating whether the master is allowed access to the Security circuit, the identifier being an hardware identifier received with the request through the communication protocol, the filter filtering the requests based on the bit indicators determined for each request.

The security circuit is further configured to execute the filtered requests.

In one embodiment, the communication infrastructure may comprise an interface interconnect and a communication bus, the interface interconnect being managed by an interconnect controller, wherein the master identifiers are managed by the interconnect controller.

The Secure Mailbox may further comprise at least one Inbox for storing the filtered requests.

In one embodiment, at least some of the requests received from the masters may comprise a priority indicator, the security circuit comprising at least two Inboxes each associated with a priority level, the filter being configured to select an Inbox in which to store a filtered request comprising a priority indicator depending on the priority level assigned to the Inbox, the secure processor being configured to execute the requests stored in the Inboxes according to an order defined by the priority levels of the Inboxes.

The Secure Mailbox may further comprise at least one Outbox associated with one or more hardware masters, each Outbox associated with one or more hardware masters being configured to store the execution data related to the execution of the requests received from the one or more associated hardware masters.

In one embodiment, each Outbox may be associated with one hardware master.

Alternatively, the Secure Mailbox may comprise at least one Outbox associated with a set of hardware masters comprising at least two hardware masters.

In still another embodiment, the Secure Mailbox may comprise a single Outbox associated with all the hardware masters.

In some embodiments, the filter may be configured to filter the requests using at least a part of the service identifier.

The identifier of a master may comprise N bits, and the filter may comprise a set of memories, the memories comprising at least a first memory configured to receive as input an address corresponding to a master identifier, in response to the receipt of a request from a hardware master identified by the master identifier, and to read in the first memory at the address a $2^N+1$ word comprising at least one indicator bit indicating if the master is allowed access to the Security circuit.

In one embodiment, the filter may be further configured to filter a request received from a hardware master using at least a part of a cryptographic key if access to the service identified by the request is subject to execution of cryptographic operations using the cryptographic key, the security circuit further comprising at least one cryptographic engine configured to execute the cryptographic operations using the cryptographic key.

The cryptographic key may comprise M bits, and the filter may comprise a second Memory configured to receive as input an address corresponding to a Service Identifier, in response to the receipt of a request from a hardware master comprising the service identifier, and to read in the second memory at the address a $2^N+1$ word indicating if the Service identified by the service identifier is accessible by the hardware master.

In an embodiment, the cryptographic key may comprise k bits, and the filter may comprise a third Memory configured to receive as input an address corresponding to the cryptographic key, if access to the service identified by the request is subject to execution of cryptographic operations using the cryptographic key, and to read in the third memory at the address a $2^N-1$ word indicating if the key is allowed to the hardware master.

In some embodiments, the security circuit may comprise a counter configured to count the number of requests received by the security circuit from each hardware master between a predefined number of readings of the Outbox associated with the hardware master, the security circuit being configured to reject the requests received from this hardware master if the number of received requests is higher than a predefined threshold.

In one embodiment, the communication protocol may be AXI.

The security circuit may further comprise at least one secure processor configured to execute the filtered requests, the secure processor delivering execution data related to the execution of the requests.

There is further provided a method of managing access to a security circuit implemented in a System on Chip, the System on Chip comprising:
at least two hardware masters;
a security circuit;
a communication infrastructure for connecting the at least two hardware masters to the security circuit, the communication infrastructure being based on a given interface communication protocol.

The Security Circuit comprises a Secure Mailbox. The method may comprise:
receiving a request from one or more hardware masters at the security circuit through the communication infrastructure, each request received from a hardware master comprising at least one service identifier identifying a service,
filtering the requests received from the hardware masters, the filtering step comprising determining at least one indicator bit, in response to the receipt of a request from a given hardware master, using at least a part of an identifier associated with the hardware master, the indicator bit indicating whether the master is allowed access to the Security circuit, the identifier being an hardware identifier received with the request through the communication protocol, the step of filtering the requests being based on the bit indicators determined for each request.

The method further comprises executing the filtered requests.

Embodiments of the invention thereby provide an improved Mailbox that provides secure access to the Secure Element by hardware masters, using an interface protocol, secure access to the cryptographic services, and/or secure access to secret parameters such as key.

The Mailbox according to the embodiments of the invention thus advantageously provides a very high security level.

The device according to the embodiments of the invention can be advantageously used in any multi-master system using an interface interconnect, such as the Advanced eXtensible Interface (AXI) Interconnect, to narrow access to some slaves or services.

The invention makes it also possible to manage the rights on the cryptographic functions and on the emitter authorized keys while enabling identification of the emitters and request filtering depending on the access rights of the emitter on the services and keys.

BRIEF DESCRIPTION OF THE DRAWINGS

The accompanying drawings are provided for illustration purposes only, and are incorporated in and constitute a part of this specification, to illustrate various embodiments of the invention and, together with the general description of the invention given above, and the detailed description of the embodiments given below, they serve to explain some of embodiments of the invention.

DETAILED DESCRIPTION

Figure 1:
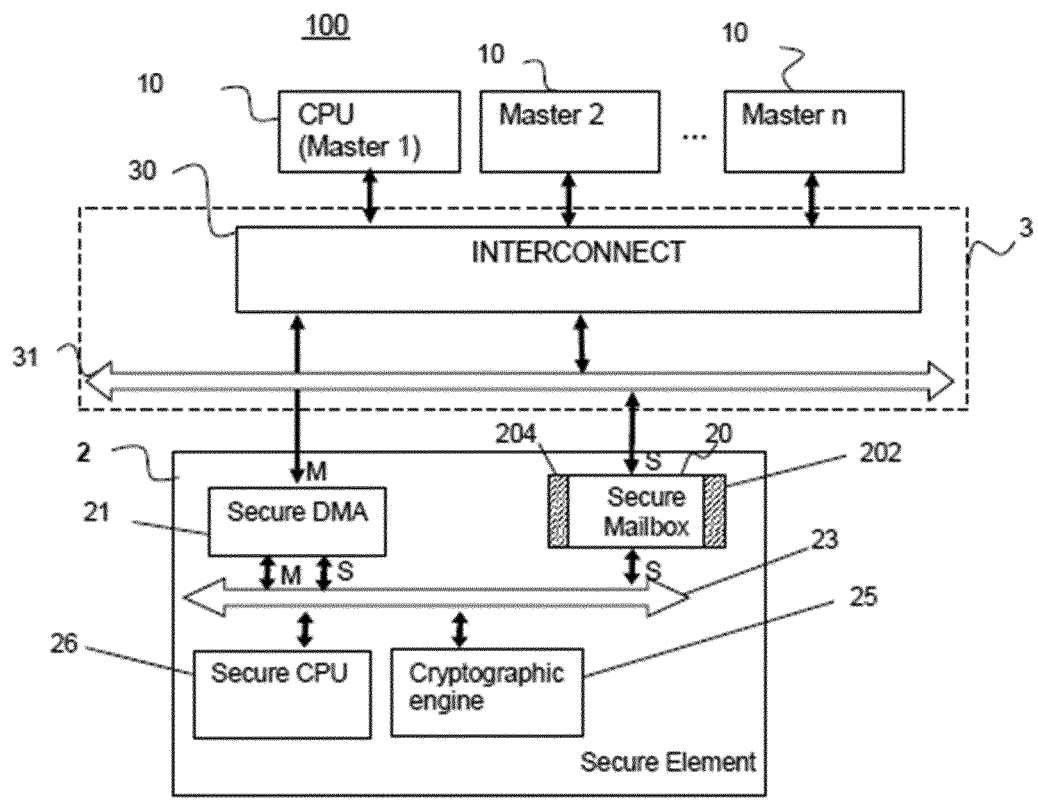
FIG. 1 is a diagrammatic view of a SOC device in accordance with some embodiments of the disclosure.

Referring to FIG. 1, there is shown a System on Chip (SoC) device 100 in accordance with embodiments of the disclosure.

The SoC device 100 (also referred to hereinafter as forming an 'Integrated Circuit Device' or indifferently as 'SoC') may include one or more processors for executing applications of the system.

The SoC 100 may be used in any secure device and/or embedded device or system such as, smartphones, tablet computers, personal computers (PCs), tablet computers, laptop computers, home entertainment devices, TV, automotive, or the like, etc.

The SOC device 100 may be implemented onto a single semiconductor substrate to form a single chip or alternatively onto a plurality of chips.

According to some embodiments of the invention, the SoC 100 may comprise n hardware masters 10, denoted Master_1, Master_2, . . . , Master_n, communicatively linked to a Security Circuit 2 through a communication infrastructure 3. The security circuit will be also referred to hereinafter as a "Security Element' or a "Secure Enclave'. In one embodiment, the SoC may comprise at least two hardware masters (n>1). As used herein a hardware master refers to any component of the SoC capable of sending one or more requests to the Secure Element 2 and of receiving back responses from the Secure Element 2. Exemplary hardware masters include, with no limitation, a processor (for example a CPU (Central Processing Unit), a GPU (Graphical Processing Unit), a RPU (Real-time Processing Unit), etc.), or a DMAC (Direct Memory Access Controller). The masters 10 may be of a same type or include masters of different types. For example, in the embodiment of FIG. 1, the first master ('Master_1') may be a SoC central processing unit (CPU) and the second master ('Master_2') may be a Real-time Processing Unit (RPU) or a Graphical Processing Unit (GPU).

As used herein a 'request' refers to a command for execution of a function by the Secure Element 2, which can be sent by a master 10 to the Secure Element 2 through the communication infrastructure 3. A request may comprise various fields, such as the address of the Inbox, the content of the request also called data, the master ID, and/or a read/write signal. A request may comprise in particular a field specifying an operation type which can be a write operation type or a read operation type. For example, a request may be a command for execution of function corresponding to a cryptographic service, such as for example:
- an encryption or a decryption function using block ciphers (e.g. AES (Advanced Encryption Standard, TDES (Triple Data Encryption Standard), etc. . . . ),
- a hash function (e.g. SHA1 SHA2 SHA3 . . . ),
- a message authentication function (e.g. HMAC, CMAC . . . ),
- a digital signature function (e.g. DSA (Digital Signature Algorithm), RSA (Rivers, Shamir and Adlement), ECDSA (Elliptic Curve Digital Signature Algorithm), etc.),
- a Random number Generation function,
- a Key wrapping function,
- a Key generation function,
- a pair wise key establishment function.

The communication infrastructure 3 forms a communication interconnect and protocol for enabling secure master/slave communication between the masters 10 and the Secure Element 20.

The communication infrastructure 3 may include an Interface Interconnect 30 for interconnecting each master 10 to the Secure Element 2 and a bus 31 for data exchange. The Interface Interconnect may be managed by an Interconnect controller.

In some embodiments, the Interface Interconnect 30 may further manage the access priority of the masters 10 to the bus 31.

In one embodiment, the communication infrastructure 3 may be based on Advanced eXtensible Interface (AXI) protocol such as AXI4.

According to the AXI protocol, before transmission of any control data (such as a signal, address or other data), both the master 10 and the slave 2 extend their "hand" for a handshake via ready and valid signals. Further, separate phase and separate channels exist for transmission of control data. The AXI protocol is also based on burst type communication to enable continuous transfer of data.

The different channels may include, without limitation:
Read Address,
Write Address,
Read Data,
Write Data, and
Write Response.

Each channel may be associated both with signals which are specific to the channel and with signals which are common to all channels.

Through the communication infrastructure 3, any signal (or address, data, response, etc.) can be transmitted through a channel source to provide an active valid signal, the same channel destination providing an active ready signal. When both signals are active, transmission may occur on the channel. As the transmission of control signals is performed in separate phases, an address may be transferred between devices before the handshake process can occur for the corresponding data transfer. In the case of information writing, the response channel may be used at the completion of the data transfer.

The Secure Element 2 may comprise a Mailbox unit 20 (also referred to hereinafter as "Secure Mailbox" or 'Mailbox') configured to manage the requests received from the masters 10. The Secure Element 2 may further comprise a Direct Memory Access (DMA) unit 21 (also referred to as a 'Secure DMA'), an internal bus 23, a Secure CPU 26, and a cryptographic engine 25.

The Secure Mailbox 20 is configured to isolate the secure processor 26 from external elements such as the masters 10. By filtering and/or registering the access of the master 10 to the internal bus 23, this ensures that the masters 10 and the secure processor 26 cannot communicate directly.

According to some embodiments of the disclosure, the Mailbox 20 may be configured to receive the requests emitted by one of the master 10 and filter the received requests based on at least a part of an identifier associated with each master (also referred to hereinafter as 'a master identifier') transmitted by the Master 10 together with the request through the communication infrastructure 3 (e.g. AXI). The Mailbox 20 may be further configured to notify the Secure CPU 26 of the receipt of a new request using an interrupt. The Mailbox 20 may then receive the response to each request from the Secure CPU 26, and notify the completion of the request processing to the emitting master 10.

Each master 10 may be configured to transmit its associated master Identifier together with the request sent to the Secure Element 2 using the communication protocol. In some embodiments, the master Identifier is comprised in the request. For example, the request may be of the type:

[Master ID|Service|Key_id|Input address|Input size-|Output address],

The request may thus comprise various parameters such as 'Master ID', 'Service', 'Key-id', 'Input Address', 'Input Size', 'Output Address'. The parameter 'Service' of the request represents the desired cryptographic service (which may be specified by a Service type, a Service mode, etc.), and the parameter 'Key_id' of the request represents the key identifier used to access to the service.

Advantageously, the Master Identifier used by the filter 201 to filter a request received by the Secure Element 2 from a given master may be a Hardware Identifier embedded in the mask of the SOC at the design phase (i.e. hardcoded). The master identifier may be uniquely managed by the Controller of the Interconnect 30. The Master Identifier is thus defined at the phase of the design of the SOC and stored in a hardware way in the SOC. This ensures that the master identifier used to filter the requests is unforgeable.

In one embodiment, the master Identifier may be the Hardware Identifier defined for the master by the communication protocol.

Considering for example the Communication protocol AXI, the master Identifier defined by the AXI communication protocol may correspond to the AXI ID transaction identifier provided for each master. A master can use such ID to identify separate transactions that are to be returned in order. All transactions associated with a given identifier AXI ID are required to remain ordered, while there is no restriction on the ordering of transactions associated with different ID. By using such AXI Identifier, a master has a unique ID during all the life cycle of the SoC. Advantageously, this ID is unforgeable by a corrupted master.

In some embodiments, the master ID of the communication protocol (for example AXI4 communication protocol) may be hardcoded by the communication interconnect. As a result, it is impossible for a master to pose as another master and access to the Secure Element 2. It is thereby impossible to any master 10 to have access to the Secure Element 2 if it is not allowed to do so.

The Internal bus 23 may be any communication bus suitable for enabling data exchange between:
- the secure DMA 21 and/or the Secure Element 2; and
- the Secure CPU 26 and/or the cryptographic unit 25.

The Secure CPU 26 may be configured to read requests comprised in at least one Inbox 202 of the Secure Mailbox 20 and to write the result of a processed request into one Outbox 204 of the Secure Mailbox 20.

In one embodiment, the Secure Mailbox 20 may comprise one Outbox 204 in association with each master 10. Alternatively, the secure Mailbox 20 may comprise a unique Outbox for all masters. In still another embodiment, the secure Mailbox 20 may comprise a set of Outboxes comprising a number of Outboxes strictly inferior to the number n of masters, each Outbox being associated with one or more masters. The following description of some embodiments of the invention will be made with reference to a Mailbox 20 comprising one Outbox 204 in association with each master 10, for illustration purpose only, the number of Outboxes being thus equal to the number n of masters.

In some embodiments, each master 10 may be assigned a given Outbox, whether it is allowed or not to allowed access to the Secure Element 2. This enables dynamic management of the access rights of the masters to the Outboxes. Accordingly, the access rights of the masters may be changed during the life of the SoC. Further, this enables optionally informing each master in case its access to the Secure Element is denied by sending a notification to the master passing through the Outbox.

In some embodiments, the Secure Element 2 may comprise at least two Inboxes 202 to enable management of priorities, that is management of the requests which are to be processed in priority with respect to the other received requests. For example, it may be needed to prioritize a request which comes from a master A, even if master B has currently multiple requests on queue.

In such embodiments, the requests received from the hardware masters 10 may comprise a priority indicator (or tag), each priority indicator associated with a given request indicating the priority according to which the request should be processed with respect to other received requests. The Secure Mailbox 20 may comprise multiple Inboxes (at least two) instead of a unique one. Each Inbox 202 may be associated with a priority level (also referred to as an Inbox priority level).

The filter 201 may be configured to select an Inbox 202 among the set of Inboxes in which to store each filtered request, based on the priority level assigned to the Inboxes and/or the priority indicator of the request. The secure processor 26 may then read and execute the requests stored in the Inboxes according to an order defined by the priority levels assigned to the Inboxes. The secure processor 26 may thus start processing the requests stored in the Inbox 202 which is assigned the highest priority level until such Inbox is empty, and then turn to process the requests stored in the next Inbox 202 corresponding to the next highest priority level, and so on until the request stored in the Inbox 202 corresponding to the lowest priority level is processed.

In one embodiment, the priority indicator comprised in each request may indicate the priority assigned to the request.

Alternatively, the priority indicator comprised in the request may indicate the priority assigned to the master which has emitted the request. All requests received from such master will then have a same priority indicator. Accordingly, when a request concerns a high-priority master is received, such request may be written in the highest priority Inbox. Otherwise, it may be written in the other Inboxes. The CPU Secure 26 may read the Inboxes according to the predefined Inbox priority order (defined by the priority levels assigned to the Inboxes), starting by reading the highest priority Inbox, thus storing the requests from the highest priority masters, and when the highest priority Inbox is empty, it may reads similarly the remaining Inboxes according to the predefined Inbox priority order.

The following description of some embodiments will be made with reference to a unique Inbox 202, for simplification and illustration purposes only.

The Secure Mailbox 20 is accordingly slave ('S') on the bus system 31 while the DMA unit 21 is master ('M') on the internal bus 23 in this example. Similarly, the Secure Mailbox 20 is a slave on the internal bus 23 of the Secure Element 2.

The Secure DMA 21 may be configured to transmit/receive data (the data being plaintext and/or ciphertext) to/from the cryptographic unit 25 over the internal bus 23, in response to cryptographic commands received by a master 10 through the communication infrastructure 3. The secure DMA 21 may receive or transmit data from or to an external memory (not shown) through the communication infrastructure 3.

The cryptographic unit 25 may use one or more encryption functions (also called "cipher"), according to the received cryptographic commands. Each encryption function referring to a series of cryptographic operations, executed in an encryption and/or decryption process, which transforms plaintext or other readable information into unintelligible ciphered text also referenced as 'ciphertext'. An encryption/decryption process is associated with a key (string of bits such as a number or a word for instance) which is used to encrypt and/or decrypt data. In an encryption process, an encryption function combines the information to be protected with a key (symmetric or asymmetric), thereby resulting in encrypted data. In a decryption process, the encryption function combines the encrypted data with a secret key, thereby resulting in decrypted data. The encryption function generates a different result for different keys or different information.

For example, each master 10 may store one or more cryptographic commands (also referred to as cryptographic requests) in the Mailbox unit 20 through the communication infrastructure 3, the cryptographic commands comprising instructions. The Secure CPU 26 may then access to the cryptographic requests from the Mailbox unit 20 over the secure bus 23, and then execute them. The Secure CPU 26 may then transmit the instructions comprised in the cryptographic commands to the cryptographic unit 25 and instruct the DMA unit 21 to transfer data to the cryptographic engine 25 through the secure bus 23. The cryptographic unit 25 may then apply the cryptographic commands to the received data, using cryptographic key(s) selected by the secure CPU 26.

The secure CPU 26 then instructs the DMA unit 21 to return back the result thus obtained from the cryptographic unit 25 to the requesting master 10 through the communication infrastructure 3.

Figure 2:
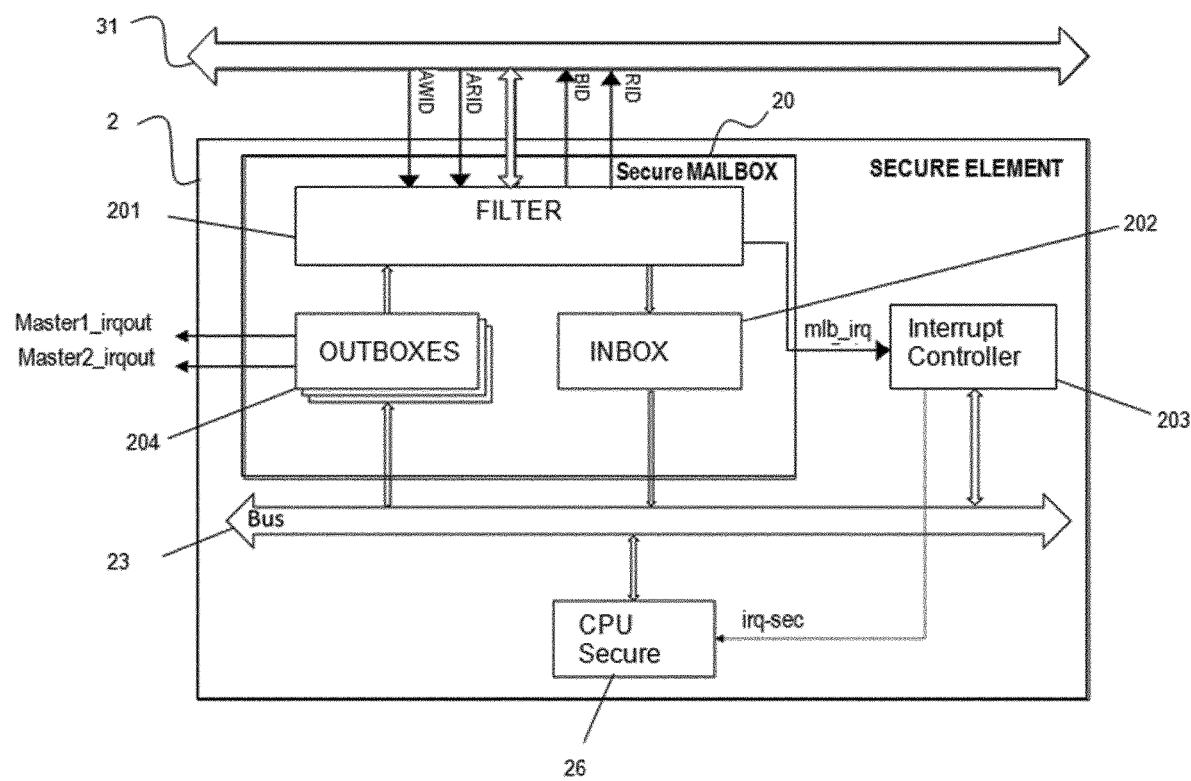
FIG. 2 is a diagrammatic view of a Multi-Master Mailbox, in accordance with some embodiments of the disclosure.

FIG. 2 represents a block diagram of the Secure Element 2 connected to the external bus 31, according to some embodiments.

As shown in FIG. 2, the Secure Mailbox unit 20 comprises an Inbox 202 configured to store new requests received from a plurality of masters 10 (the number of masters may be advantageously equal to at least two) and to notify the secure CPU 26 of any new received request using an interrupt mlb_irq. The interrupt mlb_irq may be accordingly used to indicate to the Secure Enclave Interrupt Controller that a new request is available is the Inbox 202, while the Inbox only saves valid input requests which are to be read by the secure CPU 26.

The Secure Mailbox unit 20 further comprises a set of Outboxes 204 configured to store the responses to the processed requests. The Outboxes 204 may be also configured to send notifications to each emitter 10 (master) to inform such emitter of the processing of a request using an interrupt master$_i$_irqout. In the exemplary embodiment of FIG. 2, an interrupt master1_irqout and master2_irqout are respectively sent to master1 and master2 forming the emitters 10. Outboxes 204 thus save request results which are to be read by the corresponding masters. MasterX_irqout is used to indicate to the corresponding master that a result is available in its dedicated Outbox.

As used herein, an 'interrupt' refers to a signal emitted by hardware and/or software to notify an event.

The Secure Mailbox 20 further comprises a Filter 201 configured to filter each request received from an emitting master 10 based on at least a part of the identifier associated with the emitting master 10. In one embodiment, the identifier of each master may be defined by the communication protocol, such as for example AXI4. The filter 201 may further send a validity notification to the emitting master 10, a validity information indicating if the request has been determined as valid or not. The filter 201 may transmit the validity information to the Outbox associated with the emitting master 10.

The Filter 201 thus as a consequence advantageously ensures request filtering and protection against overload of the Mailbox.

In response to the receipt of a request emitted by a given master 10 identifying a given service and specifying a given operation (read or write) for this service, the Mailbox 20 may be configured to check if the request corresponds to a write operation or a read operation. If the request relates to a write operation, the Mailbox may be configured to check if this request is allowed using the filter 201. To determine if a request is allowed (or authorized), the filter 201 may determine if the requesting master 10 is allowed access to the Secure Element 2 using at least a part of the master identifier 'ID' as defined by the communication protocol (First Condition). In some embodiments, the filter 201 may further determine if the requesting master 10 is allowed to access to the given service using at least a part of the service Identifier 'Service #ID' (Second Condition). If the service requires the use of a cryptographic key, the filter may also determine if the requesting master 10 is allowed to use such key using at least a part of the key ID (third condition). The three conditions may be used in a cumulative or alternative way.

To determine if at least one of the three conditions is satisfied, the filter 201 may compare the master Identifier and/or the Service Identifier and/or the Key Identifier to securely stored credentials. The credentials may comprise a list of the master Identifiers associated with authorized masters which may be used to determine if the first condition is satisfied. The credentials may further comprise, for each master, a list of the Service Identifiers for which the master is allowed access. The list of Service Identifiers per master may be used to determine if the second condition is satisfied. The credentials may also comprise, for each Service Identifier of the list of the Service Identifiers requiring a key, the list of master identifiers corresponding to the masters which are allowed access to the key. The list of Master Identifiers per key may be used to determine if the third condition is satisfied.

The credentials may be stored in a secure manner in an external memory. The Mailboxes may receive the credentials during the boot sequence. The credentials can be updated during the update of the firmware of the Secure Element.

In one embodiment, if the three conditions are satisfied, the request may be written in the Inbox 202 and the Secure Enclave processor 26 may be notified of the receipt of the request in the Inbox 202 through an interrupt. When a request result is available in an Outbox 204 associated with a requesting master 10, an interrupt is sent to this master.

Otherwise, it at least one of the selected conditions is not satisfied, a failure message indicating failure of the Authentication may be written in the Outbox 204 associated with the requesting master 10 and an interrupt may optionally be sent to the requesting master 10.

If the request specifies a read operation, the Mailbox 20 may be configured to perform authentication of the requesting master 10 using the master ID as defined by the communication protocol. The result of the processing of the request by the Secure CPU 25 may be written in the Outbox 204 associated with the requesting master 10 and sent to the master through the communication bus 31 (e.g. AXI bus).

It should be noted that instead of sending notifications of interrupt type to indicate that a result is available, each master 10 may alternatively use pooling to notify availability of results.

For example, considering two masters A and B of the SOC, each having its own key KA and KB respectively for decryption, A can operate alone and exchange with a target device, only A and the target device being allowed to access the content of the exchange (communication 'C_A'). If B hacks into this communication C_A, master B will try to listen the communication C_A encrypted with the key KA. By using the access management method according to the invention, master B can send a request to the Secure Element to decrypt the communication C_A with key KA. However, the Mailbox 20 will refuse the request because Master B is not allowed to access to key KA. Accordingly, master B hacking cannot be used to listen another master of the SoC.

Figure 3:
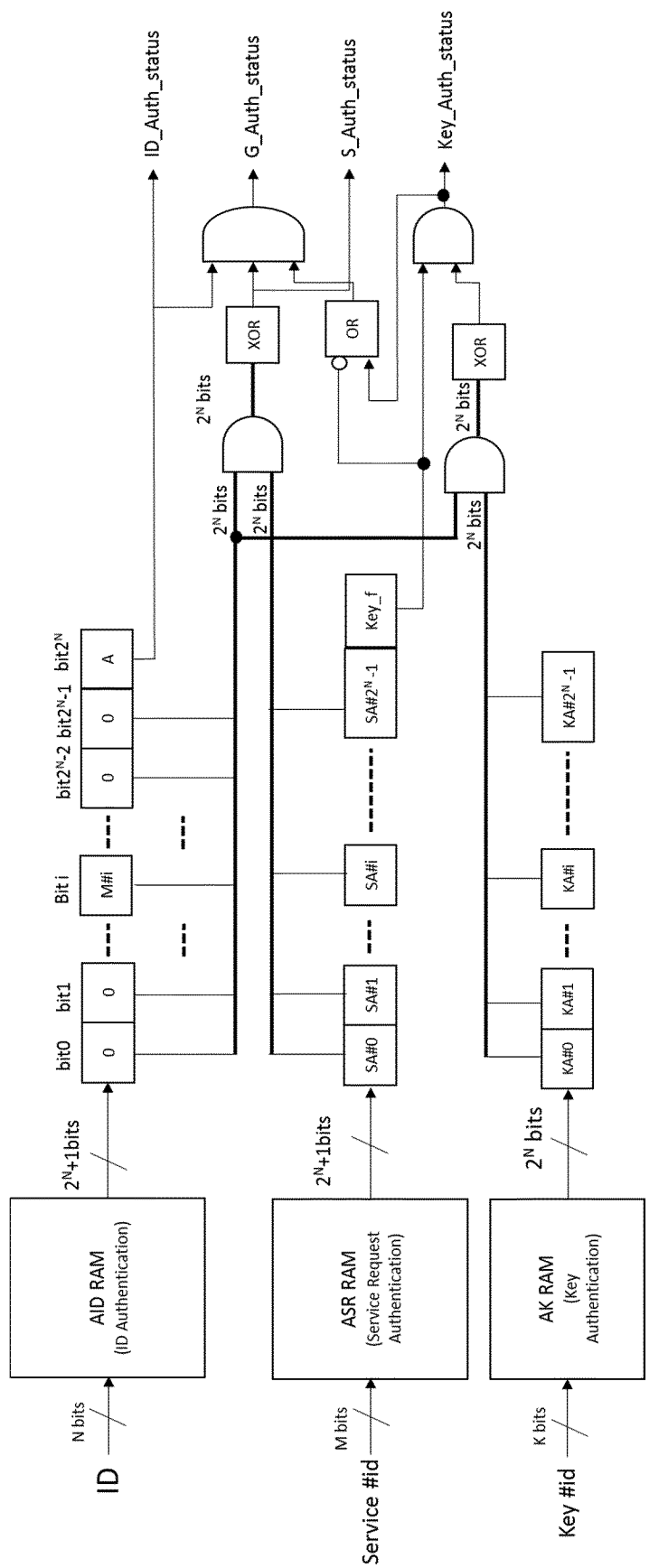
FIG. 3 is a diagrammatic view of the filter of the Secure Element, in accordance with some embodiments of the disclosure.

FIG. 3 is a diagram depicting the operation of the filter 201, according to some embodiments.

The filter 201 may comprise a set of Internal Memory Devices 2010, arranged to implement said access conditions. Each memory device 2010 associated with one of the access condition is configured to store the corresponding access credentials, receive an input representing the address of the credential that is to be read, and deliver the read information together with at least one indicator bit indicating if the access condition is satisfied. Advantageously, the memory devices 2010 may be of Random-Access Memories (RAMs). However, the invention is not limited to Internal Memory Devices of RAM type and may use other memory devices such as Registers or external memories. The following description of some embodiments will be made with reference to Internal Memory Devices of RAM type for illustration purpose only.

In the exemplary embodiment of FIG. 3, the filter 201 comprises three RAMs 2010 including:
- a first RAM denoted 'AID RAM', configured to perform authentication of the Identifier (ID) of a master 10, in response to the receipt of a request originating from such master 10;
- a second RAM, denoted 'ASR RAM' configured to perform authentication of a Service Request, in response to the receipt of such request;
- a third RAM, denoted 'AK RAM' configured to perform key authentication.

In such embodiment, the first RAM 2010 (AID RAM) may receive, in input, the ID of the emitting master 10, comprising N bits, as defined by the communication protocol (e.g. AXI4), in response to the receipt of a request originating from the emitting master 10. Such input may be used by the AID RAM as an address indicating the address in the RAM in which data are to be read. It generates an output (word) comprising $2^N+1$ bits corresponding to the data read in the AID RAM at the address corresponding to the identifier. In the output of the AID RAM, the first bits 0 to $2^N-1$ represent the master Identifier ID (for example '0001' for master 1, '0010' for master 2, '0100' for master 3, etc.), while the last bit, denoted 'A', corresponds to the indicator bit (at the bit position $2^N$), which indicates if the requesting master 10 is allowed. For example, a value A=1 may be used to indicate that an emitting master is allowed access to the Secure Element 2 while a value A=0 indicates that the access is denied to the emitting master. The first RAM (AID RAM) thus checks if the hardware master 10 is allowed using as input an address represented by the master ID of the communication protocol (e.g. AXI 4).

The first memory device 2010 (e.g. AID RAM) may comprise a data structure (referred to hereinafter as a 'first data structure'), such as a table, storing a list of addresses and, for each address of the list, a master identifier and a value of the validity indicator A indicating if the master identified by the master identifier is allowed access to the Secure Element. The first data structure may thus comprise three main columns, with the first column corresponding to the address, the second column to the Master ID and the third column to the validity indicator. The master identifier column may be subdivided in a number N of columns, each column corresponding to a bit position of the master identifier, in the exemplary case where the master identifier is a binary identifier having a given bit width N.

The second memory device 2010 (e.g. ASR RAM) may comprise a data structure (referred to hereinafter as a 'second data structure'), such as a table, storing a list of service identifiers and for each service identifier, an allowed master identifier and a key identifier key_f corresponding to the key for accessing the service. The second data structure may thus comprise three main columns, with the first column corresponding to the service identifiers, the second column to the allowed Master identifiers and the third column to the corresponding Service keys. Similarly, the allowed master identifier column may be subdivided in a number N of columns.

The third memory device 2010 (e.g. AK RAM) may also comprise a data structure (referred to hereinafter as a 'third data structure'), such as a table, storing key identifiers in a first column and for each key identifier of the first column, an allowed master identifier. The third data structure may thus comprise two main columns, with the first column corresponding to the key identifier, and the second column to the allowed Master identifiers (the second column may be subdivided in a number N of columns to store each bit of each master identifier).

Considering an example in which the SOC 100 comprises four masters 10, denoted M0, M1, M3 and M4, with only the masters M0, M1 and M2 being allowed access to the Secure Element. It is further considered that the Secure Element 2 provides 5 services, denoted S0, S1, S2, S3, S4 and S5, such that:
- access to the Service S0 is allowed to all the masters and does not require a key,
- access to the Service S1 is allowed to all masters and requires a key K1,
- access to the Service S2 is allowed to masters M0 and M1 and does not require a key,
- access to the Service S3 is allowed to masters M0 and M2 and requires a key K3,
- access to the Service S4 is allowed to masters M1 and requires a key K4.

Accordingly, key K1 is allowed to all masters, key K3 is allowed to master M0 and M1.

In such exemplary application of the invention, the three memory devices AID RAM, AS RAM, AK RAM may comprise the following tables:

| Address | Master ID | | | | A |
|---------|-----------|---|---|---|---|
| 00 | 0 | 0 | 0 | 1 | 1 |
| 01 | 0 | 0 | 1 | 0 | 1 |
| 10 | 0 | 1 | 0 | 0 | 1 |
| 11 | 1 | 0 | 0 | 0 | 0 |

- AID RAM

| - ASR RAM | | | | | |
|---|---|---|---|---|---|
| SERVICE ID | ALLOWED MASTER | | | | KEY_F |
| 0 | 1 | 1 | 1 | 1 | 0 |
| 1 | 1 | 1 | 1 | 1 | 1 |
| 2 | 0 | 1 | 0 | 1 | 0 |
| 3 | 0 | 1 | 0 | 1 | 1 |
| 4 | 1 | 0 | 1 | 0 | 1 |

| - AK RAM | | | | |
|---|---|---|---|---|
| KEY ID | ALLOWED MASTER | | | |
| 0 | 1 | 1 | 1 | 1 |
| 1 | 0 | 0 | 1 | 1 |

The second RAM 2010 (ASR RAM) may be used to determine if a given master is allowed to use a service identified by a Service Identifier 'Service #ID' specified in a request received from the master. The ASR RAM may receive in input an address corresponding to the identifier (ID) of a requested service (Service #ID), in response to the receipt of a request identifying such service. It is assumed that the service identifier Service #ID, received as input by the ASR RAM and corresponding to the address at which the ASR RAM is to read data, comprises M bits. The second RAM 2010 (ASR RAM) provides an output (word) comprising $2^N+1$ bits. Each bit of the output of the ASR RAM, except the last bit, are denoted SA#i with i=0 to $2^N-1$. The bits 0 to $2^N-1$ (SA#0 to SA#$2^N-1$) indicate if the service is available for the requesting master. The last bit of the output of the ASR RAM, that is bit $2^N$ may be used to indicate if a key key_f is required for the service identified by the identifier Service #ID or not.

The third RAM 2010 (AK RAM) may be used to determine if the requesting master is allowed to use the key key_f. The AK RAM receives as input a key identifier Key #ID, representing the identifier of the key required for the service Service #ID and comprising k bits, such input corresponding to the address at which the AK RAM is to read data. The AK RAM provides an output (word) comprising $2^N$ bits. Each bit of the output of the ASR RAM is denoted KA#i with i=0 to $2^N-1$. The output bits KA#0 to KA#$2^N-1$ indicate if the key is available for the master.

In some embodiments, the filter 201 may be configured to generate:
- a first signal denoted 'ID_auth_status' from the last bit A of the AID RAM (first RAM) indicating if the emitting master 10 is allowed,
- a second signal denoted 'S_auth_status' generated from the outputs of the AID RAM and the ASR RAM, indicating if the service Service #ID specified by the request is allowed for this emitter master 10,
- a third signal, denoted 'Key_Auth_status', generated from the outputs of the three RAMs, indicating if the key key_f required for the service identified by Service #ID is allowed for the emitting master 10, and
- a fourth signal denoted 'G_auth_status', generated from the outputs of the three RAMs, indicating if the emitting master ID, the requested service Service #ID and the key key_f are allowed.

The filter 201 may comprise a number of logical gates including:
- a first AND gate 2011 which performs an AND operation between the $2^N$ first bits of the output of the AID RAM (first RAM) and the $2^N$ first bits of the ASR RAM (second gate);
- A first XOR gate 2012 which a XOR operation between the output bits of the first AND gate 2011;
- A second AND gate 2013 which performs an AND operation between the $2^N$ first bits of the output of the AID RAM (first RAM) and the $2^N$ first bits of the AK RAM (third gate);
- A second XOR gate 2014 which performs a XOR operation between the output bits of the second AND gate 2013; the output of the second XOR gate 2014 provides the signal S_Auth_Status;
- A second AND gate 2015 which performs an AND operation between the $2^N$ first bits of the output of the AID RAM (first RAM) and the $2^N$ first bits of the AK RAM (third gate);
- A third AND gate 2016 which performs an AND operation between the output of the second XOR gate 2014 and the key key_f; the output of the third AND gate 2016 provides the signal Key_Auth_Status;
- An OR gate 2017 which performs an OR operation between the inverse of the key key_f and the output of the third AND gate 2016;
- A fourth AND gate 2018 which receives the last bit A of the output of AID RAM (which provides ID_Auth_Status), the output of the first XOR gate 2014, and the output of the OR gate 2017.

The access credentials (RAM content) may be charged during the boot phase from an external Non Volatile Memory.

The management of the access credentials and the loading of the RAMs may be handled at the boot phase of the Secure Element 2. The access credentials may be updated dynamically or statically during the life cycle of the SoC 100, using a secure boot update of the Secure Element 2.

Figure 4:
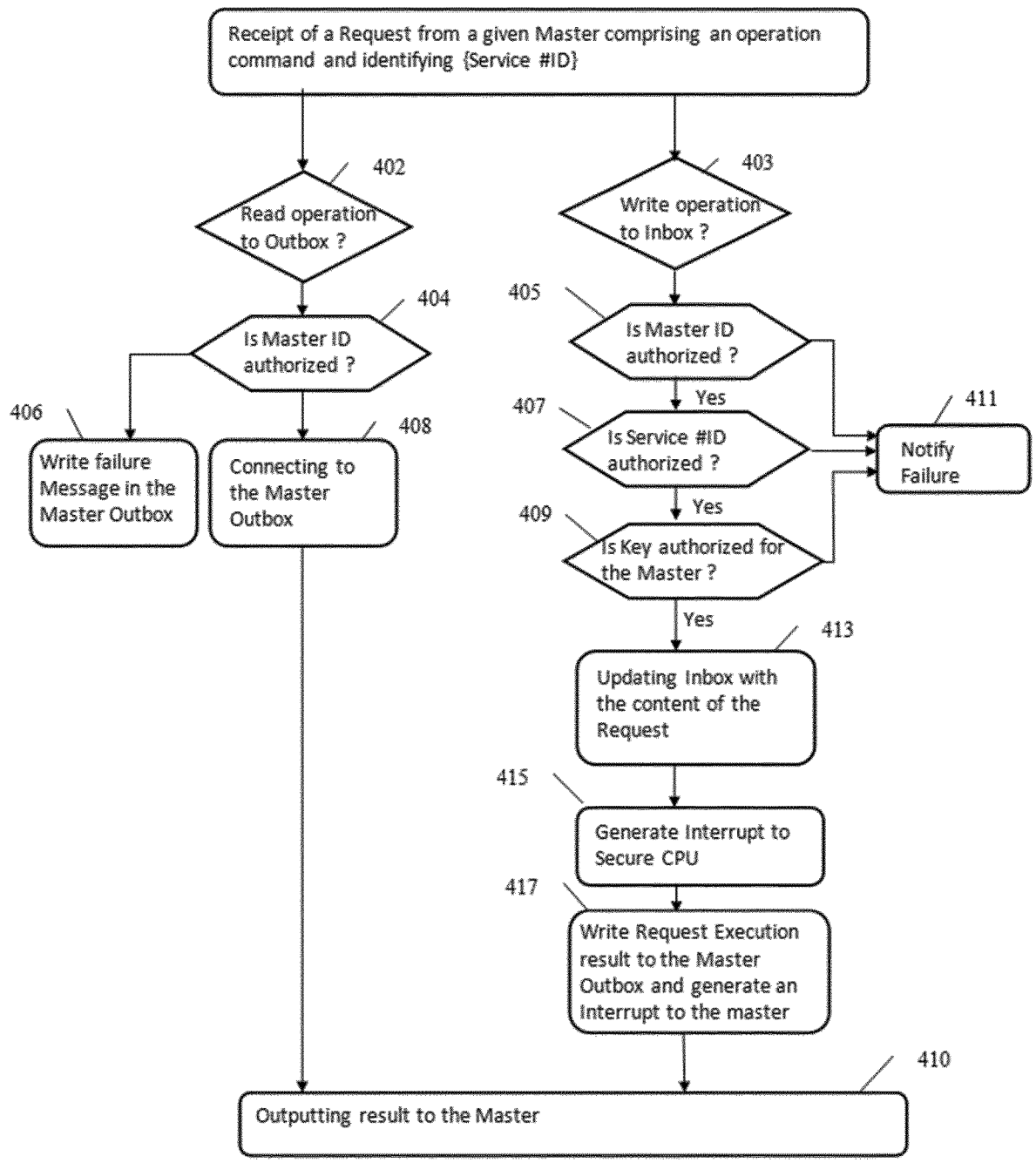
FIG. 4 is a flowchart depicting the method of processing a request emitted by a master, in accordance with some embodiments of the disclosure.

FIG. 4 is a flowchart depicting the method of controlling access of a master 10 to the Secure Element 2, in response to a request, the master 10 being identified by an identifier ID according to some embodiments.

In response to the receipt of a request from an emitting master 10, comprising an operation command (read or write) and a given service identified by an identifier Service #ID, the Secure Element 2 may determine if the operation command specified by the request is a read command (step 402) for reading data from the Secure MailBox 20 or a write command (step 403) for writing data into the Secure MailBox 20.

If the request corresponds to a write command (step 403), in step 405, 407 and 409, the Secure Mailbox 20 may check if at least three access conditions are satisfied. It should be noted that the three conditions may be checked sequentially according different orders or in parallel.

More specifically, in step 405, it is determined if the requesting master 10 is authorized access to the Secure Element 2, using the n-bits master Identifier as defined by the communication protocol (e.g. AXI4).

In step 407, it is determined if the requesting master 10 is authorized access to the service using the identifier of the M-bits service Service #ID.

In step 409, if the service requires use of a key, it is determined if the requesting master is allowed access to the key associated with the service using the k-bit Identifier of the key.

If the Secure Mailbox determines that the three conditions are satisfied (the master ID, the service Service #ID and the key are allowed), the request is sent to the Inbox 202 and the Inbox is then modified with the content of the request in step 413. The Secure CPU 26 of the Secure Element 2 may be notified that a new request is waiting for processing in step 415, using an interrupt.

The request will be executed by the Secure CPU 26 and when the execution of the request is terminated, the result may be written in the Outbox 204 associated with the emitting master in step 417. In this phase, an interrupt may be sent to the emitting master to inform it that the execution is terminated. The result may be output in step 410.

Otherwise, if the authentication of any of steps 405, 407 and 409 is unsuccessful, the emitting master 10 may be notified of the authentication failure in step 411 via the interrupt master X_irqout. Data indicating the cause of the rejection of the request may be further added to the Outbox 204 associated with the emitting master 10. In some embodiments, the interrupt master X_irqout may comprise code corresponding to the cause of rejection.

In one embodiment, the rejection of a request as well as the reason for the rejection may be performed using a buser signal instead of using the Outboxes 204.

Alternatively, if the request corresponds to a read command (block 402), the Secure Mailbox 20 may check the identity of the master 10 which emitted the request using for example authentication data such as a database of authorized masters using the associated Master Identifier in step 404. If the ID of the emitting master is determined to be allowed access to the Secure Element 2, the content of the Outbox 204 associated with the emitting master is broadcast on the data read channel of the communication protocol (such as AXI4) in step 408 after connection to the Outbox (block 406). Otherwise, if the emitting master 10 is not allowed access, an error signal is sent on the data read channel of the communication protocol (such as AXI4) in step 410.

Embodiments of the invention thus provide fast filtering of the requests emitted by one or more masters 10.

Advantageously, this ensures a secure identification of hardware masters connected through the same bus 31 to the Secure Element 2 and an efficient request filtering emitted by the masters 10.

The invention has accordingly particular advantages in a multi-master system comprising a plurality of hardware masters 10.

By implementing a master identification, the Secure Element 2 can limit the maximum number of requests sent by a specific master 10.

In one embodiment, the Secure Element 2 may comprise a counter configured to count the number of requests received by the security circuit 2 from each master 10 between a predefined number of readings of the Outbox 204 associated with the hardware master 10. In one embodiment, the counter may be configured to count the number of requests received from a given master 10 between two readings of the Outbox 204 for example. The security element 2 may comprise a comparator to compare the number of received requests to a predefined threshold and reject the requests received from the master 10 if the number of received requests is higher than the predefined threshold. Accordingly, the master is denied access to the Secure Element until the number of requests becomes lower to the predefined threshold (as the master reads its Outbox, the counter decreases). Such embodiment can be advantageously used to prevent attacks of Denial Of Service type and/or overload created by a given master 10.

The invention may be used in any system where a Secure Element 2 is needed and more than one hardware master 10 is implemented, such as a smartphone, a set-top box, a military secure system, or any transactional device or identification device or the like.

It should be noted that although certain technical aspects of the invention have been described in combination, they can be used separately in certain applications. In particular, it should be noted that although the above embodiments have been mainly described in relation with the use of a filter, the invention has also advantages for implementation of a Secure Mailbox comprising at least two outboxes, each associated with at least one Hardware master and/or a Secure Mailbox associated with at least two inboxes arranged to manage the priority of request processing.

In particular, there is also provided a System on Chip comprising:
at least two hardware masters 10;
a security circuit 2;
a communication infrastructure 3 for communication between the at least two hardware masters 10 and the security circuit 2, the communication infrastructure 3 being based on a given interface communication protocol;
each hardware master being configured to send a request to the security circuit 2 for execution of the request by the security circuit through the communication infrastructure 3, each request comprising at least one service identifier identifying a service, the security circuit 2 comprising a Secure Mailbox 20, the Secure Mailbox comprising at least two Inboxes 202 for storing the received requests, each inbox being assigned (or being associated with) a priority level, the Secure Mailbox being configured to select an Inbox in which to store a received request, depending on the priority level assigned to the Inbox, the security circuit being configured to execute the requests stored in the Inboxes according to an order defined by the priority levels of the Inboxes.

There is also provided a System on Chip comprising:
at least two hardware masters 10;
a security circuit 2;
a communication infrastructure 3 for communication between the at least two hardware masters 10 and the security circuit 2, the communication infrastructure 3 being based on a given interface communication protocol;
each hardware master being configured to send a request to the security circuit 2 for execution of the request by the security circuit through the communication infrastructure 3, each request comprising at least one service identifier identifying a service, the security circuit comprising a secure processor 25 configured to execute the requests, the security circuit 2 comprising a Secure Mailbox 20, the Secure Mailbox comprising at least two Outboxes 204, each Outbox being associated with one or more hardware masters, each Outbox associated with one or more hardware masters being configured to store the execution data related to the execution of the requests received from said one or more associated hardware masters.

There is also provided a System on Chip comprising:
at least two hardware masters 10;
a security circuit 2;
a communication infrastructure 3 for communication between the at least two hardware masters 10 and the security circuit 2, the communication infrastructure 3 being based on a given interface communication protocol;
each hardware master being configured to send a request to the security circuit 2 for execution of the request by the security circuit through the communication infrastructure 3, each request comprising at least one service identifier identifying a service, the security circuit comprising a secure processor configured to execute the requests, the security circuit 2 comprising a Secure Mailbox 20, the Secure Mailbox comprising the Secure Mailbox comprising at least one Outbox 204 associated with one or more hardware masters, each Outbox associated with one or more hardware masters being configured to store execution data related to the execution of the requests received from the one or more associated hardware masters, the security circuit 2 comprising a counter configured to count the number of requests received by the security circuit 2 from each hardware master 10 between a predefined number of readings of the Outbox 204 associated with the hardware master 10, the security circuit 2 being configured to reject the requests received from the hardware master 10 if the number of received requests is higher than a predefined threshold.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described.

The invention claimed is:

1. A method of managing access to a security circuit implemented in a System on Chip, the System on Chip comprising:
   at least two hardware masters;
   a security circuit for executing requests received from one or more hardware masters, wherein each request is a command for execution of a function corresponding to a cryptographic service by the security circuit;
   a communication infrastructure for connecting said at least two hardware masters to the security circuit, the communication infrastructure being based on a given interface communication protocol;
   the security circuit comprising a Secure Mailbox,
   the requests received by the security circuit being executed by a secure processor,
   the secure mailbox isolating the secure processor from the hardware masters so that the hardware masters and the secure processor cannot communicate directly,
   wherein the method comprises:
   receiving a request from one or more hardware masters at the security circuit through the communication infrastructure, each request received from a hardware master comprising at least one service identifier identifying a service;
   filtering, by the Secure Mailbox, requests received from said hardware masters, said filtering step comprising determining at least one indicator bit, in response to the receipt of a request from a given hardware master, using at least a part of a master identifier identifying said hardware master, said indicator bit indicating whether said master is allowed access to the Security circuit, said master identifier being a hardware identifier received with the request through the communication protocol, said step of filtering the requests being based on the bit indicators determined for each request;
   the method further comprising executing, by the security processor, the filtered requests.

2. A System on Chip comprising:
   at least two hardware masters;
   a security circuit;
   a communication infrastructure for communication between the at least two hardware masters and the security circuit, the communication infrastructure being based on a given interface communication protocol;
   each hardware master being configured to send a request to the security circuit for execution of the request by the security circuit through the communication infrastructure, each request comprising at least one service identifier identifying a service, wherein each request is a command for execution of a function corresponding to a cryptographic service by the security circuit, wherein the security circuit comprises a Secure Mailbox,
   the security circuit comprising a secure processor configured to execute each request,
   the Secure Mailbox being configured to isolate the secure processor from the hardware masters so that the hardware masters and the secure processor cannot communicate directly,
   wherein the Secure Mailbox comprises:
   a filter configured to filter a plurality of requests received from the at least two hardware masters, said filter being configured to determine at least one indicator bit, in response to each of the received requests, using at least a part of a master identifier identifying said respective hardware master, said indicator bit indicating whether said respective hardware master is allowed access to the security circuit, said respective master identifier being a hardware identifier received with each of the requests through the communication protocol, said filter being configured to filter the requests based on the bit indicators determined for each of the requests;
   the security circuit being further configured to execute the filtered requests.

3. The System on Chip of claim 2, wherein the communication infrastructure comprises an interface interconnect and a communication bus, comprising an interconnect controller configured to manage the interface interconnect, the interconnect controller further managing the master identifiers.

4. The System on Chip of claim 2, wherein the Secure Mailbox further comprises at least one Inbox for storing the filtered requests.

5. The System on Chip of claim 4, wherein at least some of the requests received from the hardware masters comprise a priority indicator, the security circuit comprising at least two Inboxes each associated with a priority level, the filter being configured to select an Inbox wherein to store a filtered request comprising a priority indicator, depending on the priority level assigned to the Inbox, the secure processor being configured to execute the requests stored in the Inboxes according to an order defined by the priority levels of the Inboxes.

6. The System on Chip of claim 2, wherein the Secure Mailbox further comprises at least one Outbox associated with one or more hardware masters, each Outbox associated with one or more hardware masters being configured to store the execution data related to the execution of the requests received from said one or more associated hardware masters.

7. The System on Chip of claim 6, wherein each Outbox is associated with a single hardware master.

8. The System on Chip of claim 6, wherein the Secure Mailbox comprises at least one Outbox associated with a set of hardware masters comprising at least two hardware masters.

9. The System on Chip of claim 2, wherein said filter is further configured to filter said requests using at least a part of said service identifier.

10. The System on Chip device of claim 2, wherein the identifier of a hardware master comprises N bits, and wherein the filter comprises a set of memories, said memories comprising at least a first memory configured to receive as input an address corresponding to an identifier of a hardware master, in response to the receipt of a request from a hardware master identified by said master identifier, and to read in the memory at said address a $2^N+1$ word comprising at least one indicator bit indicating if the hardware master is allowed access to the Security circuit.

11. The System on Chip of claim 2, wherein the filter is further configured to filter a request received from a hardware master using at least a part of a cryptographic key if access to the service identified by the request is subject to execution of cryptographic operations using said cryptographic key, the security circuit further comprising at least one cryptographic engine configured to execute said cryptographic operations using said cryptographic key.

12. The System on Chip of claim 11, wherein the identifier of a hardware master comprises N bits, and wherein the cryptographic key comprises M bits, and wherein the filter comprises a second memory configured to receive as input an address corresponding to a Service Identifier, in response to the receipt of a request from a hardware master comprising said service identifier, and to read in the second memory at said address a $2^N+1$ word indicating if the Service identified by said service identifier is accessible by the hardware master.

13. The System on Chip of claim 12, wherein the filter comprises a third memory configured to receive as input an address corresponding to the cryptographic key, if access to the service identified by the request is subject to execution of cryptographic operations using said cryptographic key, and to read in the third memory at said address a $2^N-1$ word indicating if the key is allowed to the hardware master.

14. The System on Chip of claim 2, wherein the security circuit comprises a counter configured to count a number of requests received by the security circuit from each hardware master between a predefined number of readings of the Outbox associated with said hardware master, the security circuit being configured to reject the requests received from this hardware master if the number of received requests is higher than a predefined threshold.

15. The System on Chip of claim 2, wherein the security circuit further comprising at least one secure processor configured to execute the filtered requests, said secure processor being configured to deliver execution data related to the execution of said requests.

* * * * *